Sept. 19, 1961 S. S. DEPUTY 3,000,521
CONVEYOR UNIT
Filed Oct. 10, 1958 4 Sheets-Sheet 1

INVENTOR.
SHERRILL S. DEPUTY
BY M. A. Hobbs
ATTORNEY

Sept. 19, 1961 S. S. DEPUTY 3,000,521
CONVEYOR UNIT
Filed Oct. 10, 1958 4 Sheets-Sheet 2

INVENTOR.
SHERRILL S. DEPUTY
BY M. A. Hobbs
ATTORNEY

INVENTOR.
SHERRILL S. DEPUTY
BY M. A. Hobbs
ATTORNEY

Sept. 19, 1961　　　　　S. S. DEPUTY　　　　　3,000,521
CONVEYOR UNIT
Filed Oct. 10, 1958　　　　　　　　　　　　　　4 Sheets-Sheet 4
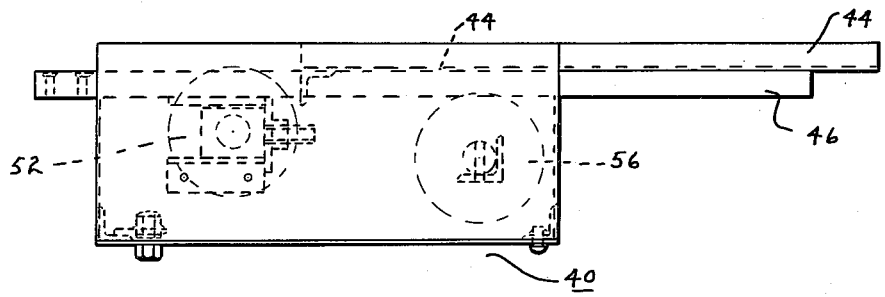
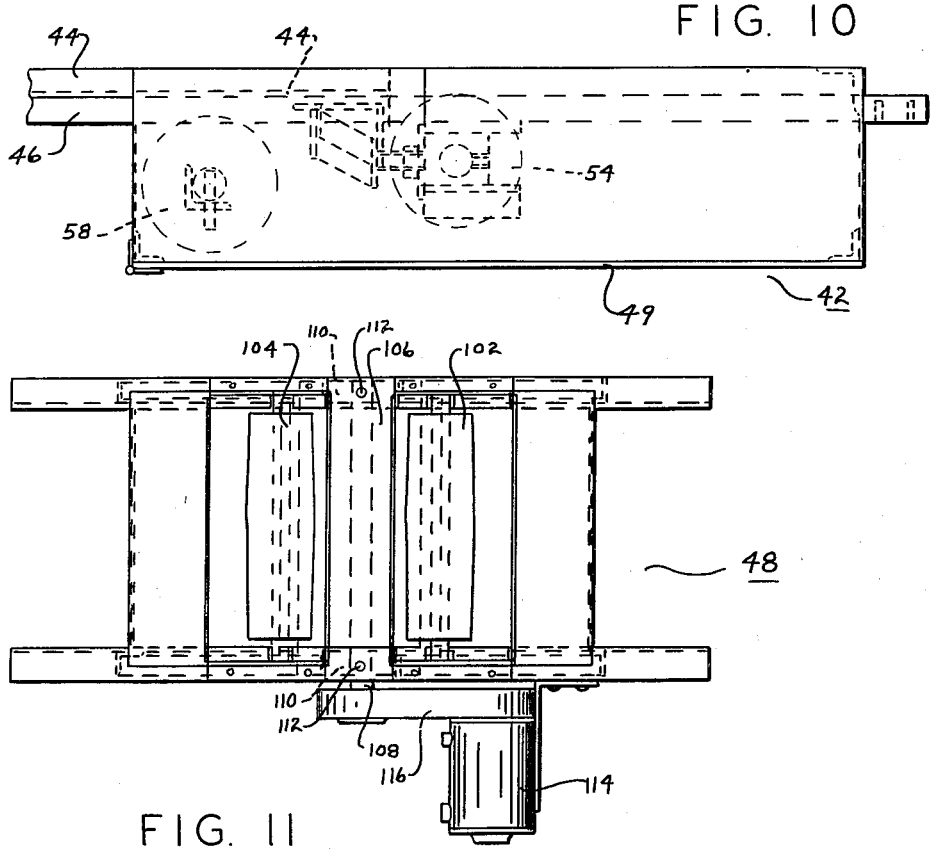
INVENTOR.
SHERRILL S. DEPUTY
BY
M. A. Hobbs
ATTORNEY

United States Patent Office 3,000,521
Patented Sept. 19, 1961

3,000,521
CONVEYOR UNIT
Sherrill S. Deputy, Elkhart, Ind., assignor to Godfrey Conveyor Company, Inc., Elkhart, Ind., a corporation of Indiana
Filed Oct. 10, 1958, Ser. No. 766,486
8 Claims. (Cl. 214—83.2)

The present invention relates to conveyors and more particularly to conveyors for vehicles such as trucks, trailers and the like.

One of the principal objects of the present invention is to provide a conveyor for trucks and trailers, which permits said vehicles to be conveniently and efficiently used for hauling either bulk commodity or dry freight and which makes possible the rapid conversion from one type of hauling to the other on the road by the operator without the use of tools or special skill or knowledge.

Another object of the invention is to provide a conveyor unit which can be installed on conventional or standard truck and trailer frames without any substantial changes or modifications being necessary in the basic construction of the vehicle and which can be installed either on new vehicles at the factory or on used vehicles in the field.

Still another object of the invention is to provide a conveyor construction which can be manufactured and fabricated as subassemblies, then shipped to the truck and trailer operation or ultimate vehicle owner for easy installation as an integral part thereof without the use of special tools or skills and with minimum alteration in the vehicle construction.

A further object is to provide a conveyor mechanism adapted for installation in truck and trailer floors, which can be effectively used in loading and unloading dry freight and in unloading bulk commodity.

Another object of the invention is to provide a compact, sturdy conveyor mechanism for trucks and trailers, which adds little gross weight to the vehicle on which it is installed and which can easily be cleaned, serviced and repaired.

Additional objects and advantages will become apparent from the following description and accompanying drawings, wherein:

FIGURE 6 is a fragmentary cross sectional view of the conveyor taken on line 6—6 of FIGURE 4;

FIGURE 9 is a side elevational view of the conveyor tail box before being installed in a vehicle;

FIGURE 10 is a side elevational view of the conveyor discharge box before being installed in a vehicle; and FIGURE 11 is a top plan view of the conveyor drive box before being installed in a vehicle.

Figure 1:
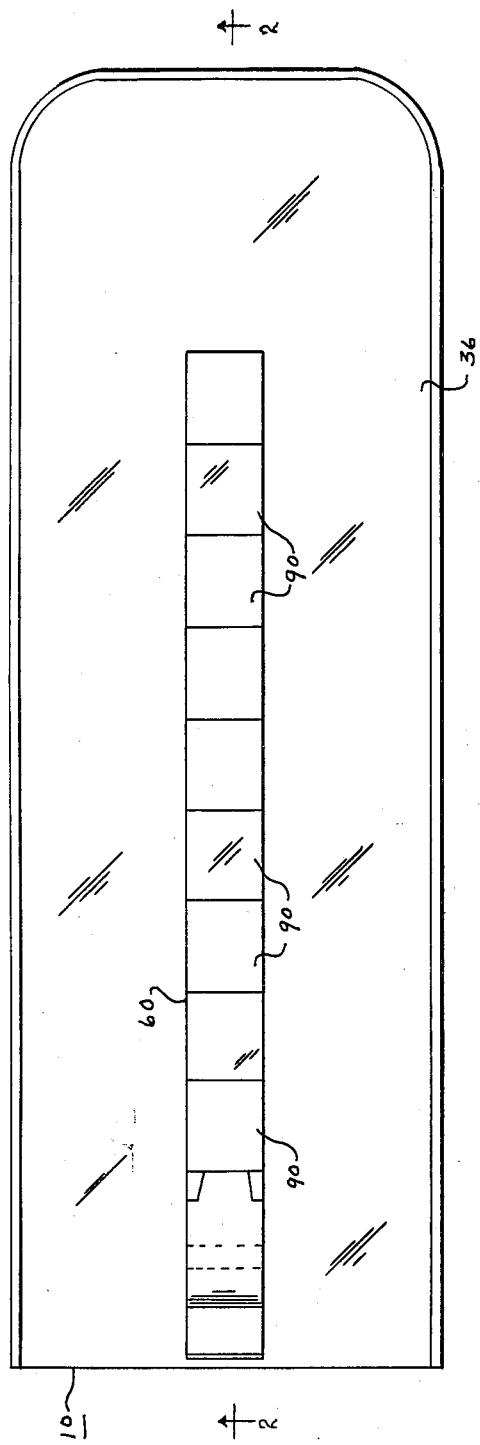
FIGURE 1 is a top plan view of the bed of a trailer showing my conveyor installed in the bottom or floor thereof.
Figure 2:
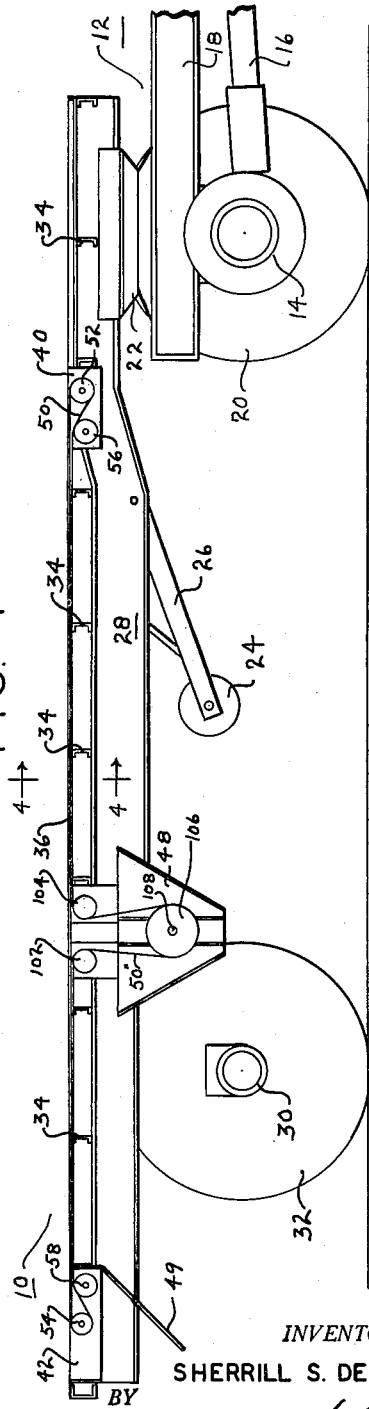
FIGURE 2 is a vertical cross sectional view of the trailer shown in FIGURE 1, taken on line 2—2 of said figure and showing the trailer connected to a tractor.

Referring more specifically to the drawings, numeral 10 designates a semi-trailer with the top and the upper portion of the sides removed, 12 a tractor for pulling the trailer including a rear axle 14, a drive shaft 16, frame 18 and one of the rear wheels 20, numeral 22 indicating the fifth wheel supporting the front end of trailer 10. Trailer 10 and tractor 12 may be considered as conventional vehicles and will not be described in detail herein, the trailer being merely changed sufficiently to include the present conveyor. The trailer can be unhitched from the tractor and the front end thereof supported by parking wheels and frame 24 and 26, respectively, for both loading and unloading operations, and consists generally of a pair of main frame members 28 (only one being shown) supported on a rear axle 30 and wheels 32, cross members 34 spaced along and joined to frame members 28 and a floor 36 mounted on and secured to members 34. The floor for most conventional trailers of this type used for general hauling is continuous throughout and materials, either bulk commodity or dry freight, are loaded onto and removed from the trailer through the rear door by hand or external material handling mechanisms.

The present conveyor is constructed to be installed in trailers and trucks of the foregoing general construction without changing the construction of the frame or cross members, with only those changes which can be readily made in the field or service shops. The conveyor consists of a tail box 40 mounted near the forward end of the trailer between two cross members 34, a discharge box 42 mounted in the rear portion of the trailer between two cross members, connecting conveyor drag pan and dust plate 44 and 46, respectively, and a drive box 48 mounted beneath the trailer floor and supported by two cross members 34. A hinged discharge door 49 is provided in the bottom of the discharge box. A continuous conveyor belt 50 is mounted on a tail pulley 52 journaled in tail box 40 and on a head pulley 54 journaled in discharge box 42. The lower section of the belt is supported in the tail box by a guide pulley 56 and in the discharge box by a guide pulley 58, said guide pulleys being journaled in their respective boxes parallel to pulleys 52 and 54. The upper surfaces of pulleys 52 and 54 are on substantially the same plane as the upper surface of the drag pans and the upper surfaces of pulleys 56 and 58 are on substantially the same plane as the upper surface of the dust plates. The drag pans extend into the tail and discharge boxes above pulleys 56 and 58 as shown in broken lines in FIGURES 9 and 10. The pulleys are preferably of the self-cleaning type of well known construction.

Figure 4:
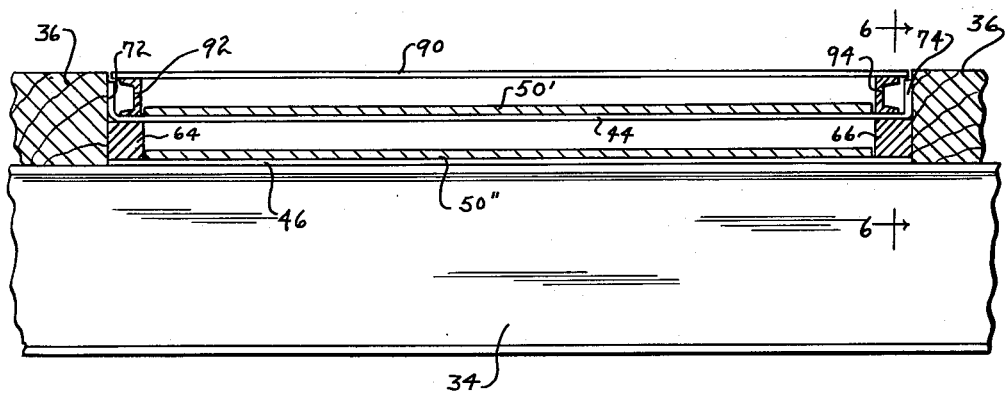
FIGURE 4 is a cross sectional view of the conveyor taken on line 4—4 of FIGURE 2 and showing the manner in which the conveyor is mounted in the trailer floor.
Figure 5:
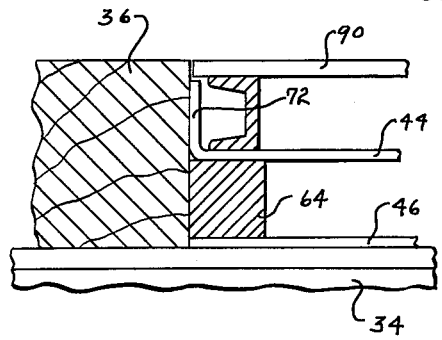
FIGURE 5 is an enlarged fragmentary view of the conveyor taken on the same line as FIGURE 4, showing the manner in which the parts of the conveyor are assembled in the trailer floor.
Figure 7:
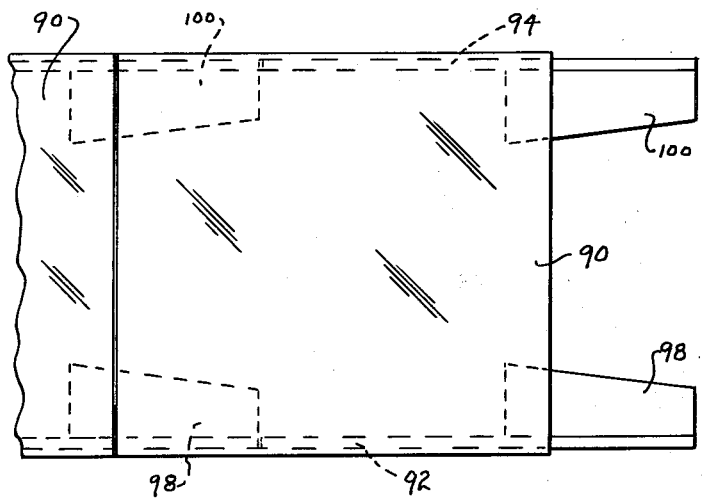
FIGURE 7 is a top plan view of a section of a cover for the conveyor.
Figure 8:
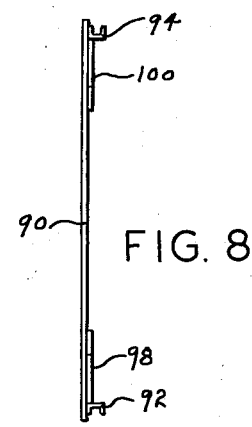
FIGURE 8 is an end view of the cover section shown in FIGURE 7.

One of the particular advantages of the present conveyor is the construction which permits it to be mounted in a slot in the floor between the upper edge of cross members 34 and the upper surface of the flooring, i.e. the thickness of the floor, so that in order to install the conveyor in a truck or trailer in the field it is merely necessary to remove a section of the flooring of the size required for the conveyor. Consequently the present conveyor can be manufactured and delivered in the form of a kit consisting of the parts shown in FIGURE 3 and thence readily installed in a trailer or truck without making any changes in the vehicle frame and with the use of standard wood and metal working tools. The section of flooring for a slot 60 can be removed either by a hand or power saw and the parts and subassemblies mounted in place on the vehicle frame. The construction of the longitudinal portion of the conveyor is clearly shown in FIGURES 4 and 5 consisting of a plurality of dust plates 46 which rest directly on the upper sides of cross members 34, one or more sections of a drag pan 44 which are supported on the dust plates by side bars 64 and 66 welded or otherwise joined to the outside edges of the underside of the drag pan. The main panel 70 of the drag pan has upturned edges 72 and 74 fitting snugly into slot 60 of the floor and abutting flush at each end against the panels of the adjacent pans. The panel and bars 64 and 66 are offset from one another longitudinally, the panel extending beyond the bars in the direction of travel of the upper section 50' of the conveyor belt 50 and overlapping the ends of the bars on the adjacent drag pan sections. The drag pan sections are secured together as shown in detail in FIGURE 6, by bolts 76 and 78 extending downwardly through countersunk holes in the edge of the panel overlapping the ends of the rods and through the rods which are provided with slots 80 and 82 in the underside for receiving nuts for the bolts. The joint between adjacent panels is sealed by a strip of metal 84 secured to the underside of the panel and extending outwardly therefrom on the same end as the projecting ends of rods 64 and 66 underlapping the panel of the adjacent drag pan.

A plurality of cover plates 90 are placed over the conveyor belt for both bulk commodity and dry freight handling. These plates are rectangular in shape and are substantially the same width as slot 60 so that a relatively close fit is obtained between the plates and the adjacent flooring. The plates are preferably constructed of steel or aluminum alloy material and are sufficiently thick to support their share of the load placed on the trailer. One of the principal features of the conveyor design is that the plates are not supported by the flooring but rather by a rigid steel construction consisting of side bars 92 and 94 secured to the underside of the plates near the edge thereof and resting on the drag pan directly above bars 64 and 66, respectively. It is thus seen that the weight placed on the upper surface of plates 90 is transmitted through bars 92 and 94, panel 70, bars 64 and 66, dust plate 46, directly to cross members 34 of the trailer frame. Bars 92 and 94 extend beyond the plate in the direction of travel of upper section 50' of the belt and under the next plate toward the rear of the trailer, giving support to said plate. Attached to the extended ends of rods 92 and 94 and to the underside of the plate are deflectors 98 and 100 which operate to control the distribution and to a limited extent the amount of bulk commodity falling onto the conveyor belt during the unloading operation. The deflectors restrict the space over the belt through which the bulk material passes to the belt and direct the material toward the center of the belt.

Figure 3:
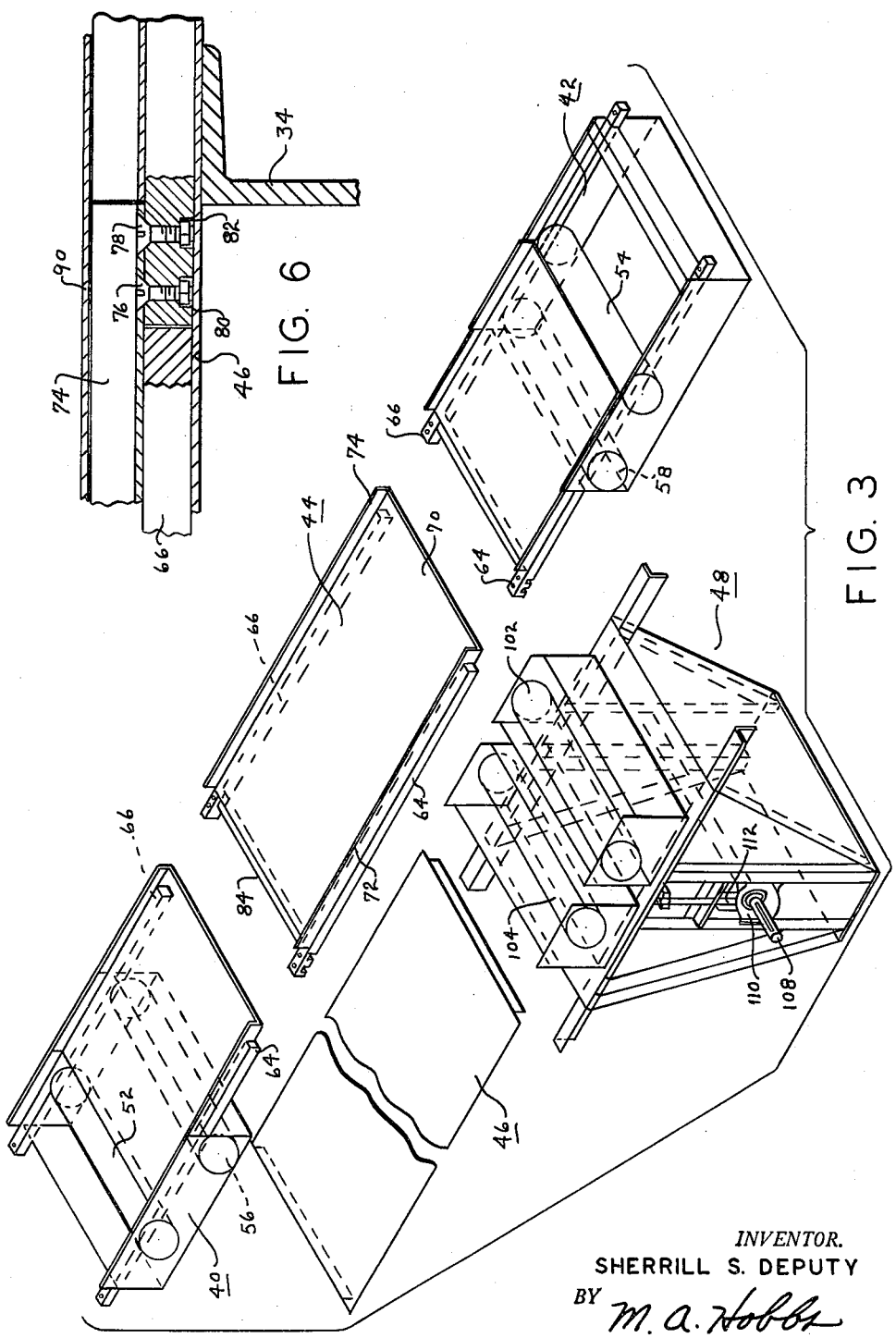
FIGURE 3 is an exploded perspective view of my conveyor showing the various subassemblies constituting the conveyor.

The conveyor belt 50 is driven by the drive mechanism shown in drive box 48 consisting of two guide pulleys 102 and 104 and a drive pulley 106, section 50" passing over pulleys 102 and 104 downwardly into box 48 and under pulley 106, the latter pulley being fixedly mounted on a shaft 108 adjustable upwardly and downwardly to control the tension placed on the belt. The upper surfaces of pulleys 102 and 104 are on substantially the same plane as the upper surface of the dust plates. As seen in FIGURE 3, the adjustment is made by shifting the bearings 110 for shaft 108 at each end of the pulley upwardly and downwardly by an adjustment screw 112. A power drive motor 114 is mounted beneath the drive box externally thereof and is connected to the drive shaft 108 by a speed reduction mechanism 116. The motor for driving the conveyor may be any suitable gasoline engine, electric or hydraulic motor, preferably adapted to operate independently of the motor used in pulling the trailer, and is controlled by conveniently located controls either at the rear or one side of the trailer.

In the operation of a trailer or truck having the present conveyor installed therein, plates 90 are placed over the conveyor belt in slot 60 in the manner shown in FIGURES 1 and 6, completely closing the slot and concealing the conveyor. Since plates 90 are flush with the upper surface of the floor a smooth surface extending throughout the entire trailer floor is provided for either bulk commodity or dry freight. When dry freight is being hauled, it is loaded, hauled and unloaded in the same manner as if the conveyor were not installed in the trailer, or the conveyor can be employed to assist in loading and unloading the trailer. When it is used for dry freight, plates 90 are removed from slot 60 and the conveyor is operated so that section 50' moves from the rear to the front of the trailer. The freight such as boxes, crates and the like is placed on the conveyor at the rear door and carried by belt 50 to a point along the conveyor where it is removed and stacked. As the trailer is filled, plates 90 are progressively placed over the conveyor in slot 60 and the freight is stacked on the plates as they are inserted in place, thus utilizing the entire floor space in the trailer. When the freight is unloaded each plate is removed from the slot as soon as the freight has been removed from it, thus exposing and increasing the length of the conveyor belt to assist in carrying the freight from the forward end of the trailer.

When bulk material is being hauled, plates 90 are first placed in slot 60 closing said slot completely and the material is then loaded into the trailer either from the rear door or from the top. In unloading the material, the rear door of the trailer is first opened and the material adjacent the door is removed until the plate covering discharge box 42 is exposed and can be removed from slot 60. After the plate has been removed, door 49 in the bottom of the discharge box is swung open and conveyor belt section 50' is operated from the front to the rear carrying the material flowing onto it to box 42 from which it is discharged through the open bottom. As each succeeding plate 90 is exposed, it is removed until the trailer has been emptied. In the construction shown it is usually necessary to push or shovel the material from along the sides and in the front end of the trailer onto the conveyor belt; however, if desired, longitudinally extending panels resting on the floor along either side of slot 60 and leaning against the trailer side wall at a substantial angle with the floor may be used to cause the material to slip or flow onto the conveyor.

It is seen that the present conveyor can be readily installed in conventional trailers and trucks by merely removing a section of the flooring along the center, and these vehicles can be used to haul both dry freight and bulk materials, thus greatly increasing the utility of the vehicle. While several modifications in the trailer construction have been mentioned herein, various other changes and modifications can be made without departing from the scope of the present invention.

I claim:

1. A conveyor for trucks and trailers having spaced cross members supporting a floor, comprising a plurality of dust plates arranged in end to end relation supported by said cross members, a plurality of drag pans spaced above said plates and arranged in end to end relation, bars along opposite edges of said drag pans resting on said dust plates and supporting said drag pans and being offset longitudinally from the respective pans to form an overlapping relationship between said bars and adjacent pans, a pulley at each end of said plates, the upper surface of which is substantially on a plane with the upper surface of said drag pans, a pulley at each end of said drag pans, the upper surface of which is substantially on a plane with the upper surface of said dust plates, a pair of closely spaced pulleys intermediate said last two pulleys, the upper surface of which is substantially on a plane with the upper surface of said dust plates, a drive pulley spaced below said pair of pulleys, a means for moving said drive pulley toward and away from said pair of pulleys, an endless conveyor belt extending around said first two mentioned pulleys and said power pulley and over said second mentioned pulleys and said pair of pulleys, a motor connected to said power pulley for driving said belt, a removable cover above said drag pans consisting of a series of plates having longitudinal bars along each side resting on said drag pans directly above said first mentioned bars, and material deflectors attached to the end of each cover plate on the end posterior to the direction of movement of said belt and at opposite sides of the plate, said deflectors tapering from the end of the respective cover plate toward the outside edge of the conveyor.

2. A conveyor for trucks and trailers having spaced cross members supporting a floor, comprising a plurality of dust plates arranged in end to end relation supported by said cross members, a plurality of drag pans spaced above said plates and arranged in end to end relation, bars along opposite edges of said drag pans resting on said dust plates and supporting said drag pans and being offset longitudinally from the respective pans to form an overlapping relationship between said bars and adjacent pans, a pulley at each end of said plates, the upper surface of which is substantially on a plane with the upper surface of said drag pan, a pulley at each end of said drag pans, the upper surface of which is substantially on a plane with the upper surface of said dust plate, a pair of closely spaced pulleys intermediate said last two pulleys, the upper surface of which is substantially on a plane with the upper surface of said dust plate, a drive pulley spaced below said pair of pulleys, a means for moving said drive pulley toward and away from said pair of pulleys, an endless conveyor belt extending around said first two mentioned pulleys and said power pulley and over said second mentioned pulleys and said pair of pulleys, a means connected to said power pulley for driving said belt, a series of plates having longitudinal bars along each side resting on said drag pan above said first mentioned bars, and material deflectors attached to the end of each cover plate on the end posterior to the direction of movement of said belt and at opposite sides of the plate.

3. A conveyor for trucks and trailers having spaced cross members supporting a floor, comprising a plurality of dust plates arranged in end to end relation supported by said cross members, a plurality of drag pans spaced above said plates and arranged in end to end relation, bars along opposite edges of said drag pans resting on said dust plates and supporting said drag pans, a pulley at each end of said plates, the upper surface of which is substantially on a plane with the upper surface of said drag pans, a pulley at each end of said drag pans, the upper surface of which is substantially on a plane with the upper surface of said dust plates, a pair of closely spaced pulleys intermediate said last two pulleys, the upper surface of which is substantially on a plane with the upper surface of said dust plates, a drive pulley spaced below said pair of pulleys, an endless conveyor belt extending around said first two mentioned pulleys and said power pulley and over said second mentioned pulleys and said pair of pulleys, a motor means connected to said power pulley for driving said belt, a removable cover above said drag pans consisting of a series of plates having longitudinal bars along each side resting on said drag pans above said first mentioned bars, and material deflectors attached to the end of each cover plate on the end posterior to the direction of movement of said belt and at opposite sides of the plate.

4. A conveyor for trucks and trailers having spaced cross members supporting a floor, comprising a plurality of dust plates arranged in end to end relation supported by said cross members, a plurality of drag pans spaced above said plates and arranged in end to end relation, bars along opposite edges of said drag pans resting on said dust plates and supporting said drag pans and being offset longitudinally from the respective pans to form an overlapping relationship between said bars and adjacent pans, a pulley at each end of said plates, the upper surface of which is substantially on a plane with the upper surface of said drag pans, a pulley at each end of said drag pans, the upper surface of which is substantially on a plane with the upper surface of said dust plates, an endless conveyor belt extending around said first two mentioned pulleys and over said second mentioned pulleys, a means for driving said belt, a removable cover above said drag pans consisting of a series of plates having longitudinal bars along each side resting on said drag pans directly above said first mentioned bars, and material deflectors attached to the end of each cover plate on the end posterior to the direction of movement of said belt and at opposite sides of the plate, said deflectors tapering from the end of the respective cover plate toward the outside edge of the conveyor.

5. A conveyor for trucks and trailers, comprising a plurality of dust plates arranged in end to end relation, a plurality of drag pans spaced above said plates and arranged in end to end relation, bars along opposite edges of said drag pans resting on said dust plates and supporting said drag pans, a pulley at each end of said plates, the upper surface of which is substantially on a plane with the upper surface of said drag pans, a pulley at each end of said drag pans, the upper surface of which is substantially on a plane with the upper surface of said dust plates, a conveyor belt extending around said first two mentioned pulleys and over said second mentioned pulleys, a means for driving said belt, a series of cover plates having longitudinal bars along each side resting on said drag pans above said first mentioned bars, and material deflectors attached to the end of each cover plate on the end posterior to the direction of movement of said belt and at opposite sides of the plate.

6. A conveyor for trucks and trailers having spaced cross members supporting a floor, comprising a plurality of dust plates arranged in end to end relation supported directly by said cross members, a plurality of drag pans spaced above said plates and arranged in end to end relation, bars along opposite edges of said drag pans resting on said dust plates and supporting said drag pans and being offset longitudinally from the respective pans to form an overlapping relationship between said bars and adjacent pans, a pulley at each end of said plates, the upper surface of which is substantially on a plane with the upper surface of said drag pans, a pulley at each end of said drag pans, the upper surface of which is substantially on a plane with the upper surface of said dust plates, a pair of closely spaced pulleys intermediate said last two pulleys, the upper surface of which is substantially on a plane with the upper surface of said dust plates, a drive pulley spaced below said pair of pulleys, a means for moving said drive pulley toward and away from said pair of pulleys, an endless conveyor belt extending around said first two mentioned pulleys and said power pulley and over said second mentioned pulleys and said pair of pulleys, a motor means connected to said power pulley for driving said belt, and a removable cover above said drag pans having longitudinal members secured to the bottom along each side and contacting said drag pans directly above said bars.

7. A conveyor for trucks and trailers and the like having spaced cross members supporting a floor, comprising a dust plate supported by said cross members, a drag pan spaced upwardly from said dust plate, bars along opposite edges of said drag pan resting on said dust plate and supporting said drag pan, a pulley at each end of said plate, the upper surface of which is substantially on a plane with the upper surface of said drag pan, a pulley at each end of said drag pan, the upper surface of which is substantially on a plane with the upper surface of said dust plate, a pair of closely spaced pulleys intermediate said last two pulleys, the upper surface of which is substantially on a plane with the upper surface of said dust plate, a drive pulley spaced below said pair of pulleys, an endless conveyor belt extending around said first two mentioned pulleys and said power pulley and over said second mentioned pulleys and said pair of pulleys, a motor connected to said power pulley for driving said belt, a series of cover plates having longitudinal bars along each side resting on said drag pan directly above said first mentioned bars, and material deflectors attached to the end of each cover plate on the end posterior to the direction of movement of said belt and at opposite sides of the plate.

8. A conveyor for trucks and trailers having spaced cross members supporting a floor, comprising a dust plate supported directly by said cross members, a drag pan spaced upwardly from said dust plate, bars along opposite edges of said drag pan resting on said dust plate and supporting said drag pan, a pulley at each end of said plate, the upper surface of which is substantially on a plane with the upper surface of said drag pan, a pulley at each end of said drag pan, the upper surface of which is substantially on a plane with the upper surface of said dust plate, a pair of closely spaced pulleys intermediate said last two pulleys, the upper surface of which is substantially on a plane with the upper surface of said dust plate, a drive pulley spaced below said pair of pulleys, an endless conveyor belt extending around said first two mentioned pulleys and over said power pulley and over said second mentioned pulleys and said pair of pulleys, a means for driving said belt, and a removable cover above said drag pan having longitudinal members secured to the bottom along each side and contacting said drag pan directly above said bars.

References Cited in the file of this patent

UNITED STATES PATENTS

| | | |
|---|---|---|
| 1,837,276 | Levin | Dec. 22, 1931 |
| 2,107,682 | Wall | Feb. 8, 1938 |
| 2,507,252 | Hoover | May 9, 1950 |
| 2,577,926 | Stiles | Dec. 11, 1951 |
| 2,598,470 | Vutz | May 27, 1952 |
| 2,633,230 | Duncan | Mar. 31, 1953 |
| 2,718,296 | Johnson | Sept. 20, 1955 |
| 2,829,018 | Valtri | Apr. 1, 1958 |